Oct. 2, 1956

E. A. WATSON ET AL
SERVO CONTROL OF INTERNAL COMBUSTION
PRIME MOVERS BY BLOWER PRESSURE
Filed March 24, 1952

2,764,868

Inventors
E. A. Watson
G. H. Bottoms
By Howard Browning Reubold
Attys.

United States Patent Office 2,764,868
Patented Oct. 2, 1956

2,764,868

SERVO CONTROL OF INTERNAL COMBUSTION PRIME MOVERS BY BLOWER PRESSURE

Ernest Ansley Watson, Gibbet Hill, Coventry, and Charles Herbert Bottoms, Simonstone, near Padiham, England, assignors to Joseph Lucas (Industries) Limited, Birmingham, England Application March 24, 1952, Serial No. 278,178

Claims priority, application Great Britain March 27, 1951

3 Claims. (Cl. 60—39.28)

This invention has for its object to provide means for controlling the action of a jet-engine, gas turbine or other like internal combustion engine in response to a force depending on the ratio of air-blower-inlet, or atmospheric and blower delivery pressures.

The invention comprises a liquid-operated servo-mechanism which is controlled by a valve, a lever mechanism for actuating the valve, and means for exerting on the lever mechanism a force or forces corresponding to the ratio of air-blower-inlet or atmospheric and delivery pressures, the movable part of the servo-mechanism being adapted to vary the position of the fulcrum of the lever mechanism and to operate a part adapted to effect adjustment of a liquid-fuel control mechanism, or other engine controlling means.

Figure 1:
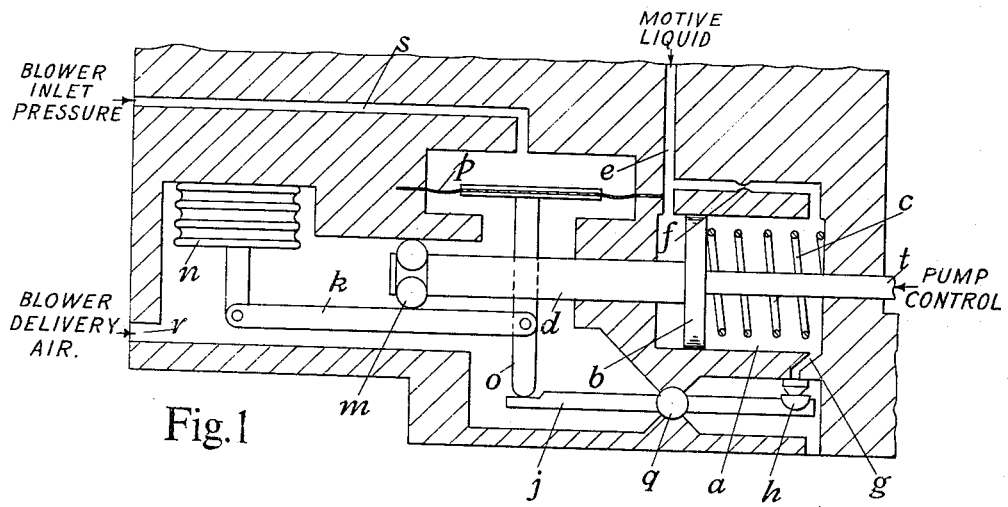
Figure 2:
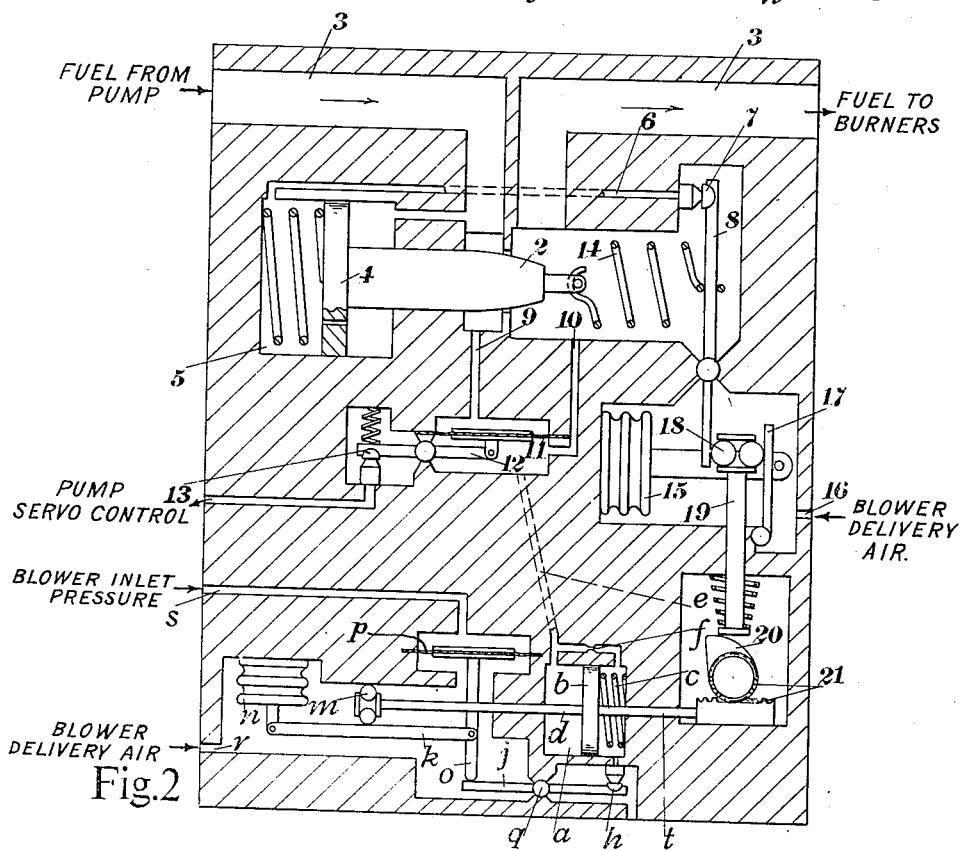

In the accompanying drawing:

Figure 1 is a diagrammatic sectional view illustrating an embodiment of the invention, and Figure 2 is a diagrammatic sectional view (to a smaller scale than Figure 1) illustrating a means under the control of the mechanism shown in Figure 1 for varying the rate of fuel supply to the engine.

Referring to Figure 1, the servo-mechanism comprises a cylinder $a$ containing a piston $b$ loaded by a spring $c$, and a piston rod $d$ extending from one side of the piston. Motive liquid is admitted to one end of the cylinder through a passage $e$ from any convenient part of the fuel supply system, and both ends of the cylinder are in communication through a restricted orifice $f$. At the other end of the cylinder is provided a vent $g$ which is controlled by a valve $h$ mounted on a lever $j$. The arrangement is such that when the vent is closed, the piston moves in one direction under the action of the spring, and when the vent is open, the piston moves in the opposite direction under the preponderating liquid pressure acting on the side of the piston remote from the spring, this servo-mechanism being similar to that described in the specification of Patent No. 2,403,371.

In a chambered body part associated with the servo-mechanism is arranged another lever $k$ having a movable fulcrum $m$ which is carried by the rod $d$ extending from the piston. At one end, the lever $k$ is loaded by an evacuated elastic capsule $n$. At the other end, the lever is connected to a rod $o$ which at one end bears on the vent valve lever $j$, and which at the other end is attached to a diaphragm $p$. The two chambers containing the opposite ends of the lever $j$ are isolated from each other at the fulcrum $q$ of the lever $j$ as will be seen in the drawing. The chamber containing the capsule $n$ and associated lever $k$ is supplied with air from the blower at delivery pressure through the passage $r$, which pressure acts on one side of the diaphragm $p$, and also on the capsule, which is of smaller diameter than the diaphragm. Air at blower-inlet or atmospheric pressure is admitted to the other side of the diaphragm through a passage $s$. The arrangement is such that the lever $k$ is subject to forces corresponding to the ratio of the blower-inlet and delivery pressures.

Normally the vent valve $h$ is closed, but in the event of the said pressure ratio exceeding a predetermined amount, due to increase of the blower-delivery pressure, or a fall in the inlet or atmospheric pressure, the vent valve $h$ is opened, causing the piston to be moved to the right by liquid pressure acting on the left hand side of the piston $b$. This movement is utilised (through the medium of a rod $t$ extending from the piston $b$) to operate an engine controlling means, and at the same time to adjust the position of the movable fulcrum $m$ to effect re-closing of the valve $h$.

In one arrangement the servo-mechanism is adapted to vary the rate of fuel supply to the engine, in which case a mechanism as shown in Figure 2 is employed.

A variable throttle 2 in the fuel supply passage 3 is arranged to set up a pressure difference in the fuel at the inlet and outlet sides of the throttle. The throttle is connected to a liquid operated servo-mechanism which is similar to the one above described and comprises a spring-loaded piston 4 slidable in a cylinder 5. One end of the cylinder 5 is in communication with the inlet side of the throttle and the other end communicates with a vent 6 controlled by a valve 7 carried on a lever 8. The pressure difference at the inlet and outlet sides of the throttle is caused to act (through passages 9, 10) on opposite sides of a diaphragm 11 connected to a lever 12 which carries the vent valve 13 of a further servo-mechanism (not shown) adapted to control the fuel pump output. The lever 8 carrying the vent valve 7 of the throttle servo-mechanism is loaded by a spring 14 connected to the throttle. In a chamber containing a part of the lever 8 is contained an evacuated elastic capsule 15 which is subject to blower-delivery pressure (supplied through a passage 16). The capsule acts on a second lever 17 movement being transmitted from this lever to the lever 8 through a slidably adjustable abutment 18. The abutment is carried by one end of a spring-loaded rod 19 which at the other end is movable by a rotatable cam 20, and the latter is movable through a rack-and-pinion mechanism 21 by the rod $t$ extending from the piston $b$ of the first described servo-mechanism.

The arrangement is such that upon an increase of blower delivery pressure for example, whereby the ratio of blower delivery to blower inlet pressure is increased so that it exceeds a predetermined amount, the preponderance of pressure acting on the lower side of the diaphragm $p$ will raise the latter and through the medium of the rod $o$ the lever $j$ is released causing the valve $h$ to open and thus relieve the pressure on the right hand side of the piston $b$. The liquid pressure acting on the left hand side of said piston will therefore preponderate and the piston will be moved to the right to actuate the cam 20, thereby raising the rod 19 and altering the position of the abutment 18 relative to the lever 8 to reduce the leverage thereon. This action permits the vent valve 7 to open and reduce the liquid pressure acting on the left hand side of the piston 4 so that the latter is moved to left under the liquid pressure acting on its opposite side and thereby causes an opening movement of the throttle 2 to increase the supply of fuel. In this manner it will be seen that any change in the ratio of blower delivery to blower inlet pressure will cause the throttle to take up a new position and the fuel flow through the passage 3 will be correspondingly adjusted.

The invention is not, however, limited to the example above described, as the blower-air ratio mechanism may be adapted to actuate any other engine control mechanism. Further, instead of the diaphragms above mentioned, equivalent pistons may be provided.

Having thus described our invention what we claim as new and desire to secure by Letters Patent is:

1. Means for controlling the action of an internal combustion prime mover having a blower for supplying air thereto, comprising in combination a liquid-operated servo-mechanism, means operable by said servo-mechanism for varying the action of the prime mover, a valve for controlling the action of said servo-mechanism, a lever mechanism for actuating said valve, said lever mechanism having a fulcrum which is displaceable relatively to said lever mechanism as a whole for varying the effect of said lever mechanism on said valve, movable actuating means responsive to the ratio of the blower delivery and inlet pressures and operatively connected to said lever mechanism so that variation of said ratio initiates movement of said valve for bringing said servo-mechanism into action, and means interconnecting said servo-mechanism and displaceable fulcrum for varying the position of the latter under the action of said servo-mechanism, and thereby causing said valve to assume a new position determined by said lever mechanism for stabilising said servo-mechanism until said ratio is again changed.

2. Means according to claim 1, in which the means for varying the action of the prime mover comprises a variable throttle in a fuel supply passage, and further comprising a second liquid operated servo-mechanism for actuating the throttle, a valve for controlling said second servo-mechanism, and an operative connection between the first servo mechanism and said valve.

3. Means according to claim 1, in which the means for varying the action of the prime mover comprises a variable throttle in a fuel supply passage, and further comprising a second liquid operated servo-mechanism for actuating the throttle, a valve for controlling said second servo-mechanism, a lever for actuating said valve, a movable abutment for said lever, a cam for displacing said movable abutment, and an operative connection between the cam and the first servo-mechanism.

References Cited in the file of this patent

UNITED STATES PATENTS

| | | |
|---|---|---|
| 2,350,781 | Lichte | June 6, 1944 |
| 2,450,535 | Watson et al. | Oct. 5, 1948 |
| 2,503,048 | Ifield | Apr. 4, 1950 |
| 2,657,529 | Lawrence | Nov. 3, 1953 |
| 2,657,530 | Lee | Nov. 3, 1953 |
| 2,686,414 | Lee | Feb. 9, 1954 |

FOREIGN PATENTS

| | | |
|---|---|---|
| 560,196 | Great Britain | Mar. 24, 1944 |
| 580,149 | Great Britain | Aug. 8, 1946 |